United States Patent
Miura et al.

[11] Patent Number: 6,113,785
[45] Date of Patent: Sep. 5, 2000

[54] POLYSULFONE MEMBRANE FOR PURIFYING BLOOD

[75] Inventors: Morikazu Miura, Yokohama; Yoshiaki Nitadori, Fuji; Akira Kiguchi; Shigemi Mukaiyama, both of Yokohama, all of Japan

[73] Assignee: Asahi Kasei Kogyo Kabushiki Kaisha, Osaka, Japan

[21] Appl. No.: 09/051,335

[22] PCT Filed: Oct. 9, 1996

[86] PCT No.: PCT/JP96/02940

§ 371 Date: Apr. 9, 1998

§ 102(e) Date: Apr. 9, 1998

[87] PCT Pub. No.: WO97/13575

PCT Pub. Date: Apr. 17, 1997

[30] Foreign Application Priority Data

Oct. 9, 1995 [JP] Japan ................................ 7-286332

[51] Int. Cl.$^7$ ........................................... A01D 71/68
[52] U.S. Cl. ................ 210/500.41; 210/500.34; 210/500.42; 264/41; 264/48; 264/49
[58] Field of Search .................. 210/500.14, 500.42, 210/500.23, 500.35, 645, 500.34; 264/41, 48, 49; 96/4

[56] References Cited

U.S. PATENT DOCUMENTS 5,376,274 12/1994 Muller et al. ................ 210/500.41
5,543,465 8/1996 Bell et al. ................ 525/182

FOREIGN PATENT DOCUMENTS 62-201603 9/1987 Japan .
2-160026 2/1990 Japan .

*Primary Examiner*—Ana Fortuna
*Attorney, Agent, or Firm*—Birch, Stewart, Kolasch & Birch, LLP

[57] ABSTRACT

A polysulfone membrane for purifying blood having excellent compatibility with blood and the process producing the membrane are disclosed. The membrane comprises a mixed polymer phase of a graft copolymer and/or block copolymer having a molecular weight of $3\times10^5$ daltons or more and comprising (A) a hydrophilic segment and (B) a hydrophobic segment (exclusive of polysulfone) in a total amount of from 0.5 to 30 parts by weight per 100 parts by weight of polysulfone, with the monomer unit ratio (A/B) between the segments A and B being from 0.5 to 5. The copolymer is preferably a graft copolymer where the hydrophilic segment is a polyvinylpyrrolidone segment and the hydrophobic segment is a polystyrene segment. The membrane can be prepared by applying a wet film formation process to a dope containing an appropriate solvent of the mixed polymer, such as N,N-dimethylacetamide. The membrane for purifying blood reduces cumbersomeness in the washing of the coagulated membrane during the film formation process and allows recovery of the solvent from the coagulating solution at a high recovery rate because the copolymer contained in the structure of the membrane is substantially not eluted into water contacted during the film formation process and the washing step.

14 Claims, No Drawings

POLYSULFONE MEMBRANE FOR PURIFYING BLOOD

This application claims the benefit under 35 U.S.C. §371 of prior PCT International Application No. PCT/JP96/02940 which has an International filing date of Oct. 9, 1996 which designated the United States of America, the entire contents of which are hereby incorporated by references.

TECHNICAL FIELD

The present invention relates to a membrane for blood purification such as hemodialysis and hemofiltration and more specifically, the present invention relates to a polysulfone membrane for purifying blood having excellent compatibility with the blood and the membrane of which the membrane producing performance is improved in the washability of the membrane and recoverability of the solvent used in producing the membrane.

BACKGROUND OF THE INVENTION

Polysulfone resin has been extensively applied and developed as a medical material because of its excellent heat resistance, chemical resistance and γ-ray resistance. The polysulfone resin is also used as a material in highly transmissive artificial dialyzers. However, the polysulfone itself is hydrophobic and exhibits poor blood compatibility by itself. Hitherto, various methods have been developed in an attempt to improve the compatibility with the blood. For example, Japanese Unexamined Patent Publication (Kokai) No. 61-93801 discloses a method of adding polyvinylpyrrolidone to thereby improve the blood compatibility of the membrane and Japanese Unexamined Patent Publication (Kokai) No. 6-165926 discloses a polysulfone hollow fiber membrane containing a vinylpyrrolidone-base polymer and a polyglycol.

The compatibility with the blood can be improved by blending a hydrophilic polymer as in these techniques, however, since the hydrophilic polymer blended with the polysulfone resin is water-soluble, a thorough washing of the membrane formed is essential. Due to this, the washing step generally takes a long time and the film formation process is inefficient. Further, when a water-soluble hydrophilic polymer is added, in addition to the problem of a cumbersome washing process, there is a serious problem in the production, due to the fact that the water-soluble polymer added during the film formation is eluted in a large amount into the coagulating solution. More specifically, at the time of recovering a solvent of the membrane from the coagulating solution, the solvent becomes difficult to recover because the viscosity of the coagulating solution is greatly increased due to the presence of the hydrophilic polymer.

From the standpoint of suppressing elution of the added hydrophilic polymer, for example, Japanese Unexamined Patent Publication (Kokai) Nos. 63-97205 and 4-300636 disclose a technique of subjecting a polysulfone-base membrane having added thereto a hydrophilic polymer such as polyvinylpyrrolidone, to heat treatment or radiation treatment. However, the heat treatment must be performed at a fairly high temperature (170° C. or more) and the membrane performance is difficult to maintain. Further, the method of effecting cross-linking by high-power γ-ray irradiation or the like may reduce the blood compatibility of the membrane. Furthermore, these methods cannot overcome the problem accompanying the elution of the hydrophilic polymer into the coagulating solution.

In order to improve the water permeability of the polysulfone membrane, a hydrophilic polymer having low solubility in water may be added. In this respect, a method for forming a membrane comprising adding a graft copolymer or block copolymer consisting of a polysulfone segment and a hydrophilic polymer segment is disclosed, for example, in Japanese Unexamined Patent Publication (Kokai) Nos. 62-168503, 62-199621, 62-201603, 63-88003, 63-84603 and 2-140234.

SUMMARY OF THE INVENTION

An object of the present invention is to provide a polysulfone-base hemocatharsis membrane having excellent compatibility with the blood.

Another object of the present invention is to provide a process for producing a polysulfone membrane for purification of blood having excellent compatibility with the blood through a simple washing step with a high recovery of the solvent used for the dope of the formed membrane.

DETAILED DESCRIPTION OF THE INVENTION

The present invention has been accomplished by taking advantage of the fact that a polysulfone membrane containing a graft copolymer and/or block copolymer consisting of a hydrophilic segment and a hydrophobic segment exhibits excellent compatibility with the blood and the graft copolymer and/or block copolymer is not easily eluted into the coagulating solution at the time of forming the membrane.

More specifically, the objects of the present invention have been attained by a polysulfone membrane for purifying blood comprising a graft copolymer and/or block copolymer consisting of (A) a hydrophilic segment and (B) a hydrophobic segment (exclusive of polysulfone), the monomer unit ratio (A/B) of A to B being from 0.5 to 5 and the total of A and B being from 0.5 to 30 parts by weight per 100 parts by weight of polysulfone.

The monomer unit A or B as used herein means a repeating unit in a polymer constituting the hydrophilic segment or the hydrophobic segment, respectively. For example, in a graft or block copolymer consisting of a polyvinylpyrrolidone segment and a polystyrene segment, the monomer units A and B are a repeating unit represented by the following formulae [I] and [II], respectively:

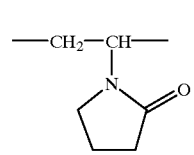

[I]

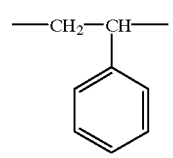

[II]

By analysis of the membrane surface, it was found that an improved eluting property and excellent compatibility with blood of the polysulfone membrane for purifying blood of the present invention are attained by making the hydrophobic segment embedded in the polysulfone membrane, or bonded thereto by a bonding force of the affinity using a graft and/or block copolymer comprising the hydrophilic and the hydrophobic segments, whereby the ratio of the hydrophobic segment to the hydrophilic segment on the membrane surface becomes smaller than the ratio of the hydrophobic segment to the hydrophilic segment in the entire membrane.

More specifically, the present invention further provides a polysulfone membrane for purifying blood comprising a graft copolymer and/or block copolymer consisting of (A) a hydrophilic segment and (B) a hydrophobic segment (exclusive of polysulfone), the monomer unit ratio (A/B) of A to B being from 0.5 to 5, the total of A and B being from 0.5 to 30 parts by weight per 100 parts by weight of polysulfone, and the monomer unit ratio (U=B'/A') between the hydrophobic segment (B') and the hydrophilic segment (A') present on the surface of the membrane being smaller than the monomer unit ratio (V=B/A) between the hydrophobic segment (B) and the hydrophilic segment (A) present in the entire membrane.

The monomer unit ratio "U" as used herein is defined as a value derived from abundance ratios of the hydrophilic unit in the copolymer, the hydrophobic unit in the copolymer and the polysulfone, obtained by determining the quantities of characteristic elements of both units and polysulfone, elements in the characteristic chemical bonding state (if desired, quantity determined by the peak split process) and the constituent elements according to the ESCA (electron spectroscopy for chemical analysis). For example, a method for determining the monomer unit ratio "U" in the case of a membrane of polysulfone resin comprising a repeating unit represented by the following formula [IV] containing a copolymer consisting of a polyvinylpyrrolidone segment and a polystyrene segment is described. Abundance ratios of nitrogen originated from the vinylpyrrolidone unit and sulfur originated from polysulfone are determined by ESCA. Similarly, the abundance ratio of nitrogen in the polyvinylpyrrolidone film and the abundance ratio of sulfur in the additive-free polysulfone membrane are determined by ESCA. From the abundance ratios determined, the covering ratio of the vinylpyrrolidone unit and the exposure ratio of polysulfone are determined. Then, from the covering ratio of the vinylpyrrolidone unit and the exposure ratio of polysulfone, the covering ratio of the styrene unit is determined. From the covering ratio of the vinylpyrrolidone unit and the covering ratio of the styrene unit, the monomer unit ratio "U" of the membrane is obtained.

The polysulfone as used in the present invention is a polyaryl ether sulfone polymer characterized by the structure containing a repeating unit represented by the following formula [III]. Examples thereof include a polymer comprising a repeating unit represented by formula [IV] and a polymer comprising a repeating unit represented by formula [III].

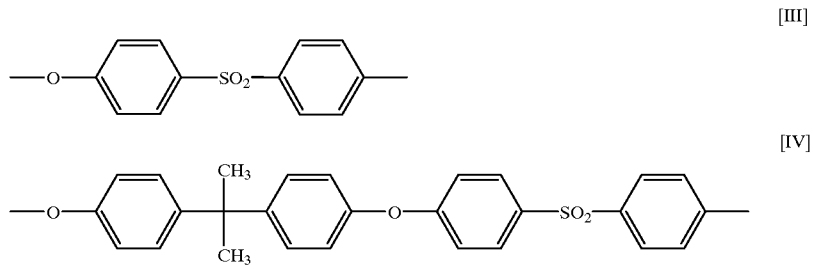

The graft copolymer and/or block copolymer consisting of (A) a hydrophilic segment and (B) a hydrophobic segment (exclusive of polysulfone) as used in the present invention means a block copolymer having a form of A—B, A—B—A, B—A—B, $(A—B)_x$—A, B—$(A—B)_x$, a graft copolymer comprising a main chain of (A) a hydrophilic segment and a branch of (B) a hydrophobic segment, or a graft copolymer comprising a trunk of (B) a hydrophobic segment and a branch of (A) a hydrophilic segment.

The copolymer preferably has a molecular weight of from $3\times10^4$ to $2\times10^6$ daltons.

Examples of the hydrophilic segment of the present invention include a segment comprising a polymer or copolymer of a monomer such as methacrylic acid, acrylic acid, itaconic acid, 2-hydroxyethyl methacrylate, 2-hydroxyethyl acrylate, 2-hydroxypropyl methacrylate, 2-hydroxypropyl acrylate, glycerol methacrylate, polyethylene glycol methacrylate, N,N'-dimethylacrylamide, N-methylacrylamide, dimethylaminoethyl methacrylate, methylenebisacrylamide, diacetone acrylamide, N-vinylpyrrolidone or vinyl alcohol, or a polymer such as a polyethylene glycol segment or a polypropylene glycol segment.

Examples of the hydrophobic segment of the present invention include a segment comprising a polymer or copolymer of a methacrylic ester or acrylic ester monomer such as methyl methacrylate, ethyl methacrylate, n-propyl methacrylate, n-butyl methacrylate or benzyl methacrylate, a styrene monomer such as styrene, methylstyrene or ethylstyrene, a vinyl carboxylate monomer such as vinyl acetate, or an acrylonitrile monomer.

The copolymer may be polymerized by a commonly known method. For example, a block copolymer may be synthesized from a hydrophilic monomer and a hydrophobic monomer by anionic living polymerization, cationic living polymerization or photoiniferter polymerization (see Nippon Gomu Kyokaishi (Journal of Japan Rubber Association), Vol. 59, No. 12, p. 658 (1986)). The synthesis method of the graft copolymer is described, for example, in Japanese Unexamined Patent Publication (Kokai) No. 50-77526 and Angew Makromol. Chem., Vol. 132, 81 (1985). Several Synthesis examples are described below in greater detail. A synthesis example of a block-type copolymer by the photoiniferter polymerization is described below. A hydrophilic monomer or a hydrophobic monomer and a living photopolymerization initiator having a dithiocarbamate group (e.g., benzyl N,N-diethyldithiocarbamate, p-xylenebis(N,N-diethyldithiocarbamate)) is dissolved in a solvent and polymerized by irradiating with UV light to synthesize a polymer having a growing terminal. From this reaction solution, the polymer having a growing terminal is purification-separated. This polymer and a hydrophobic monomer in the case of a polymer obtained from a hydrophilic monomer, or a hydrophilic monomer in the case of a polymer obtained from a hydrophobic monomer, are dissolved in a solvent and polymerized starting from the growing terminal by again irradiating with UV light to obtain a block copolymer. A block copolymer having a repeating unit of $(A—B)_X$—A or $(B—A)_X$—B can be obtained by repeating the purification-separation of the polymer having a growing terminal and the polymerization with a monomer under irradiation with UV light.

An example of a synthesis of a block-type copolymer by anionic living polymerization is described below. A dehydrated hydrophilic monomer or hydrophobic monomer is polymerized with a polymerization initiator (e.g., sodium naphthalene) in a dehydrated solvent to synthesize a polymer having a growing terminal. After the reaction of the monomer is completed, a dehydrated hydrophobic monomer in the case of a polymer obtained from a hydrophilic monomer, or a dehydrated hydrophilic monomer in the case of a polymer obtained from a hydrophobic monomer, is added to the reaction solution obtained above to effect polymerization starting from the growing terminal. As a result, a block copolymer is obtained. A block copolymer having a repeating unit of $(A—B)_X$—A or $(B—A)_X$—B can be obtained by repeating the addition of a monomer after completion of the monomer reaction.

A synthesis example of a graft-type copolymer by the copolymerization of a macromonomer and a monomer is described below. Macromonomers such as polyethylene glycol or polystyrene having a double bond at one terminal are commercially available but the macromonomer can be synthesized by the following method, if desired. A hydrophilic monomer or hydrophobic monomer is polymerized using azobisisobutyro-nitrile (AIBN) as a polymerization initiator and 3-mercaptopropionic acid as a chain transfer agent to synthesize a prepolymer having a carboxyl group at one terminal. The prepolymer obtained is reacted with glycidyl methacrylate and, as a result, a hydrophilic macromer or hydrophobic macromer is obtained. Other than this, the macromonomer may also be obtained by a method of polymerizing a hydrophilic monomer or hydrophobic monomer by anionic polymerization and adding methacrylic acid chloride thereto to react with the polymer to obtain a hydrophilic macromer or hydrophobic macromer having a double bond at one terminal.

A hydrophilic macromer and a hydrophobic monomer or a hydrophobic macromer and a hydrophilic monomer are polymerized in the presence of a polymerization initiator and a graft copolymer consisting of a hydrophobic segment and a hydrophilic segment is obtained.

The polysulfone-base hemocatharsis membrane of the present invention can be prepared by a so-called wet film formation process where polysulfone and a graft copolymer and/or block copolymer comprising (A) a hydrophilic segment and (B) a hydrophobic segment in a total amount of from 0.5 to 30 parts by weight per 100 parts by weight of polysulfone, with the monomer unit ratio (A/B) between the segments A and B being from 0.5 to 5, is dissolved in a predetermined solvent to have a polysulfone concentration of from 12 to 25 wt % based on the prepared dope, the thus-prepared dope for forming a membrane is formed into a plane membrane or a hollow fiber, the plane membrane or hollow fiber formed is contacted with a predetermined coagulating solution, the solvent is removed and the residue is washed.

The polysulfone membrane for purifying blood of the present invention is advantageous in that the membrane having the above-described structure is formed during the coagulation process and the graft copolymer and/or block copolymer is substantially not eluted into the coagulating solution or the washing solution after the coagulation. Accordingly, in recovering a solvent of the membrane from the coagulating solution by distillation or the like, an increase in the viscosity ascribable to elution of the polymer does not occur and a high recovery of the solvent can be achieved. Further, since the polymer is not eluted during washing after the coagulation, the washing step can be completed within a short time.

BEST MODE FOR CARRYING OUT THE INVENTION

In the graft copolymer and/or block copolymer for use in the present invention, the hydrophilic segment (A) is preferably a polyvinylpyrrolidone segment or a polyethylene glycol segment, more preferably a polyvinylpyrrolidone segment. The hydrophobic segment (B) is preferably a polymethyl methacrylate segment or a polystyrene segment, more preferably a polystyrene segment.

A graft copolymer is preferably used. The graft copolymer is preferably a graft copolymer having a trunk of polymethyl methacrylate segment or polystyrene segment and a branch of polyethylene glycol segment, or a graft copolymer having a trunk of polyvinylpyrrolidone segment and a branch of polymethyl methacrylate segment or polystyrene segment, and most preferably a graft polymer having a trunk of polyvinylpyrrolidone and a branch of polystyrene segment.

These graft copolymers and/or block copolymers can be easily prepared by a known synthesis method described in detail above.

The copolymer preferably has a molecular weight of from $3 \times 10^4$ to $2 \times 10^6$ daltons, more preferably from $5 \times 10^4$ to $1.5 \times 10^6$ daltons, still more preferably from $1 \times 10^5$ to $1 \times 10^6$ daltons. If the molecular weight is too small, satisfactory effects cannot be obtained by addition or the problem of cumbersomeness in the water washing step still remains, whereas if the molecular weight is too large, mixing with the polysulfone resin proceeds poorly and a uniform membrane cannot be obtained in practice. The molecular weight as used herein means a molecular weight at peak out of the molecular weight in terms of styrene obtained by the gel permeation chromatography (GPC). More specifically, it is a GPC molecular weight at peak in terms of styrene, obtained using a Shodex (trademark) GPC KD-800 series as a column, N,N-dimethylformamide containing 0.01 mol/l of lithium bromide as an eluent and a differential refractometer as a detector.

The ratio of the hydrophilic segment (A) to the hydrophobic segment (B) of the present invention is, in terms of the monomer unit ratio (A/B) of A to B, from 0.5 to 5, preferably from 1 to 4, more preferably from 1.2 to 3. The ratio of the hydrophilic segment to the hydrophobic segment is chosen so as to strike a balance between the insolubility in water and the improvement in the blood compatibility of the polysulfone-base membrane. More specifically, in the case where the ratio of the hydrophilic segment to the hydrophobic segment is too large, the problem of cumbersomeness in the water washing step is not overcome or the elution into the coagulating solution cannot be sufficiently suppressed, as a result, the recovery of the solvent can be difficult. On the other hand, if the ratio of the hydrophilic segment to the hydrophobic segment is too small, the blood compatibility of the polysulfone membrane cannot be sufficiently improved.

The hydrophilic segment (A) and the hydrophobic segment (B) each must be contained in the polysulfone-base membrane of the present invention in an amount such that the total amount of A and B is from 0.5 to 30 parts by weight, preferably from 3 to 25 parts by weight, more preferably from 6 to 20 parts by weight, per 100 parts by weight of polysulfone. If the amount of the hydrophilic segment and the hydrophobic segment contained in the membrane is too large, there arises a problem in the heat resistance or the mechanical strength of the membrane. On the other hand, if the content of these segments are too small, good compatibility with the blood cannot attained.

The polysulfone membrane for purifying blood of the present invention preferably has a form such that in the cross-sectional structure, the monomer unit ratio (U=B'/A') between the hydrophobic segment (B') and the hydrophilic segment (A') present on the membrane surface is smaller than the monomer unit ratio (V=B/A) between the hydrophobic segment (B) and the hydrophilic segment (A) present in the entire membrane. For example, when a value (W, decrement of the hydrophobic segment on the membrane surface) obtained in such a manner that the monomer unit ratio (U=B'/A') between the hydrophobic segment (B') and the hydrophilic segment (A') present on the membrane surface is subtracted from the monomer unit ratio (V=B/A) between the hydrophobic segment (B) and the hydrophilic segment (A) present in the entire membrane and the result is divided by the monomer unit ratio (V=B/A) between the hydrophobic segment (B) and the hydrophilic segment (A) present in the entire membrane, is used as an index, the index value is preferably from 0.3 to 1, more preferably from 0.5 to 1, still more preferably from 0.7 to 1.

The polysulfone-base hemocatharsis membrane of the present invention can be obtained by a wet film formation process which is a conventionally and commonly known technique. Either a so-called hollow fiber membrane having a hollow fiber form or a plane membrane may be used. The dope (stock solution for forming a membrane) for use in the wet film formation is a solution obtained by dissolving and mixing the polysulfone and the copolymer described above in a solvent which dissolves both the polysulfone and the copolymer. The solvent is not particularly limited, however, solvents such as N,N-dimethylacetamide, N,N-dimethylformamide, N-ethyl-pyrrolidone and dimethylsulfoxide have a high solubility and are easily available and therefore, these may be conveniently used. Among these solvents, N,N-dimethylacetaide is most preferred in view of solubility for polysulfone, safety to the organism and cost. These solvents may of course be used individually but may be used in combination of two or more solvents so as to adjust the solubility for the polymer.

With respect to the concentration of polysulfone, if it is too small, the membrane can be formed only with difficulty and the strength of the membrane may be lowered, whereas if it is too large, the spinning property may be worsened or the hole size may be reduced. Accordingly, the concentration of polysulfone is preferably from 12 to 25 wt %, more preferably from 15 to 20 wt %, still more preferably from 16 to 18 wt %, based on the dope. However, the concentration of polysulfone is not limited to this range and a concentration lower or higher than this range may be used so as to obtain a membrane having desired properties.

The copolymer added to the dope is scarcely eluted into the coagulation bath during the film formation and therefore, the eluted amount need not be taken into consideration. The copolymer may be added in an amount corresponding to the amount of the copolymer intended to be present in the membrane.

The plane membrane can be obtained by casting the above-described dope on a substrate such as glass plate by means of a surgical blade and then dipping it in a coagulation bath. The hollow fiber membrane can be obtained by extruding the dope from the sheath part of a spinneret of tube-in-orifice type, extruding at the same time an inner coagulating solution from the core part and, after traveling in air, dipping the fibers in a coagulation bath. The inner coagulating solution and the coagulation bath solution for use in the film formation each comprise mainly a solvent, such as water or an alcohol, in which polysulfone and the copolymer are only slightly soluble. However, in order to obtain the described properties of the hollow fiber membrane, a mixed solution of a solvent of polysulfone and the copolymer with water or an alcohol may be used. The plane membrane or hollow fiber after dipping in a coagulation bath is, if desired, further washed with water in a water washing bath. The solvent remaining in the membrane after the wash may be removed by washing the membrane with hot water or the like. Thereafter, the membrane may be dried after attaching thereto a hole size retaining agent such as glycerine, if desired.

The amount of the hydrophilic segment or the hydrophobic segment contained in the polysulfone-base membrane may be analyzed by NMR (nuclear magnetic resonance spectroscopic method), for example, from a proton NMR spectrum obtained using a solvent capable of dissolving or thoroughly swelling the membrane. For example, in the case of a polysulfone membrane comprising a repeating unit represented by formula [IV] containing a copolymer consisting of a polyvinylpyrrolidone segment and a polystyrene segment, in the case where chloroform-$d_1$ is used as a solvent in the analysis, the quantities of polysulfone, polyvinylpyrrolidone segment and polystyrene segment can be relatively determined from the peaks in the spectrum when the chemical shift is in the vicinity of 7.85 (4 protons), 3.2 (2 protons) and/or 3.7 (1 proton), and 6.55 (2 protons), respectively. These quantities each can be converted into the part by weight using the formula weight per unit. In the case where the system is complicated and difficult to analyze, fractions divided by the gel permeation chromatography (GPC) or liquid chromatography (LC) may be analyzed one after another by NMR.

In analyzing the composition of the dope for forming a membrane, low molecular weight substances such as a solvent are removed by evaporation or the like, the polymer obtained is ground into a powder and in the case of containing the hydrophilic polymer and/or hydrophobic homopolymer, these are removed by washing or reprecipitation, and then the residue is dried to obtain a sample polymer composition. The finally obtained polymer composition can be analyzed as described above using NMR. After fractionating the polymer composition by GPC or LC the composition may also be analyzed by subjecting each fraction to NMR analysis or quantitative analysis.

The present invention is described in greater detail below by referring to the Examples, however, the present invention should not be construed as being limited thereto.

The evaluation methods used in the Examples are described below.

(1) Quantitative Evaluation of Platelets Adhered (plane membrane)

Whole blood was sampled from a healthy man using a syringe previously containing 3.8 wt % of a sodium citrate solution (1 to 9 volume ratio of blood) and a platelet-rich plasma was prepared by centrifugal separation. Heparin (final concentration: 10 U/ml) and a calcium chloride solution (final concentration: 5 mM) were added to the plasma and the resulting plasma was contacted with a plane membrane and allowed to stand at 37° C. for 1 hour. Thereafter, the membrane was washed with phosphoric acid-buffered physiological saline and then, a phosphoric acid-buffered physiological saline solution containing 0.5% of tritonX-100 was added to dissolve the adhered platelets. The lactic acid dehydrogenase activity in the solution obtained was measured by an LDH measurement kit (manufactured by Boelinger Manheim) and the change ($\Delta ABS$) in the absorbance was quantitatively evaluated. The value obtained and converted into a unit area equivalence (unit: $IU/m^2$) was used as an index for the quantity of platelet adhered.

(2) Quantitative Evaluation of Platelet Adhered (hollow fiber)

Whole blood was sampled from a healthy man using a syringe previously containing 3.8 wt % of a sodium citric acid solution (1 to 9 volume ratio of blood) and heparin (final concentration: 10 U/ml) and a calcium chloride solution (final concentration: 5 mM) were added thereto. The resulting blood was passed through a hollow fiber at 37° C. and a linear velocity of 1 cm/sec for 10 minutes. The inside of the hollow fiber as washed with phosphoric acid-buffered physiological saline and the platelet adhered were dissolved by a phosphoric acid-buffered physiological saline solution containing 0.5% by weight of a surface active agent Triton-X. The lactic acid dehydrogenase activity in the solution eluted was measured by an LDH measurement kit (manufactured by Boelinger Manheim) and the change ($\Delta ABS$) in the absorbance was quantitatively evaluated. The value obtained and converted into a unit area equivalence (unit: $IU/m^2$) was used as an index for the quantity of platelet adhered.

(3) Recovery of Solvent and Determination of Solvent Recovery

The coagulation bath solution used in the formation of a membrane and the hot water used in the washing of the membrane were combined and subjected to superfractionation under reduced pressure using a fractionating column until the viscosity of the solution amount to 500 pma•s (measuring temperature: 25° C.) to recover the solvent used in the dope and the coagulating solution. From the amount of solvent recovered and the amount of solvent used (sum of the amount of the solvent in the dope used and the amount of the solvent in the coagulating solution used), the solvent recovery (%) was obtained.

(4) Quantitative Determination of Additives in Membrane

The membrane was thoroughly dried and then dissolved in chloroform-$d_1$ and the NMR of the solution obtained was measured. The quantities of polysulfone, polyvinylpyrrolidone segment and polystyrene segment were relatively determined from the peaks in the spectrum when the chemical shift was in the vicinity of 7.85 (4 protons), 3.2 and 3.7 (3 protons in total), and 6.55 (2 protons), respectively. These quantities each was converted into the part by weight using the formula weight per unit. The monomer unit ratio A/B of (A) polyvinylpyrrolidone segment to (B) polystyrene segment was obtained by the relative determination values.

(5) Quantitative Determination of Membrane Surface Composition

The membrane was thoroughly dried and the abundance ratios of nitrogen originated from vinylpyrrolidone unit and sulfur originated from polysulfone polymer on the membrane surface were determined by ESCA (electron spectroscopy for chemical analysis). Similarly, the abundance ratio of nitrogen in the polyvinylpyrrolidone membrane and the abundance ratio of sulfur in the additive-free polysulfone membrane were determined by ESCA. From the abundance ratios determined, the covering ratio (X %) of the vinylpyrrolidone unit and the exposure ratio (Y %) of polysulfone on the membrane surface were determined according to the following equations (1) and (2).

Covering ratio (X %) of vinylpyrrolidone unit=(abundance ratio of nitrogen on the membrane surface/abundance ratio of nitrogen in the polyvinylpyrrolidone film)×100(%)  Equation (1):

Exposure ratio (Y %) of polysulfone=(abundance ratio of sulfur on the membrane surface/abundance ratio of sulfur in the additive-free polysulfone membrane)×100(%)  Equation (2):

(6) Decrement of Hydrophobic Segment on the Membrane Surface

From the exposure ratio (Y %) of polysulfone and the covering ratio (X %) of vinylpyrrolidone unit obtained by the method described in the evaluation method (5), the monomer unit ratio (U=B'/A') between the styrene unit (B') and the vinylpyrrolidone unit (A') present on the membrane surface was determined according to the following equation (3). Further, the monomer unit ratio (V=B/A) between the styrene unit (B) and the vinylpyrrolidone unit (A) present in the entire membrane was determined by the method described in the evaluation method (4). And, according to the following equation (4), a value obtained by subtracting the monomer unit ratio (U=B'/A') between the styrene unit (B') and the vinylpyrrolidone unit (A') present on the membrane surface from the monomer unit ratio (V=B/A) between the styrene unit (B) and the vinylpyrrolidone unit (A) present in the entire membrane was divided by the monomer unit ratio (V=B/A) between the styrene unit (B) and the vinylpyrrolidone unit (A) present in the entire membrane to obtain a value (W, decrement of the hydrophobic segment on the membrane surface).

U=(100−X−Y)/X  Equation (3):

W=V−U/V  Equation (4):

EXAMPLE 1

15 parts by weight of styrene polymer (AS-6, produced by Toa Gosei KK, GPC peak top molecular weight: 14,000 daltons), 85 parts by weight of N-vinylpyrrolidone, 0.2 parts by weight of azobisisobutyronitrile and 100 parts by weight of N,N dimethylacetamide were charged into a brown bottle and dissolution mixed while stirring with a mixing rotor. The mixed solution obtained was transferred into a glass-made ampule bottle and the ampule was freeze deaerated in a vacuum and then the ampule was sealed.

The mixed solution in the ampule was heated in a constant-temperature water bath at 60° C. for 8 hours to effect polymerization. From the resulting solution, the solvent was removed under heating in a vacuum and the solid matter obtained was ground into fine powder. The fine powder obtained was washed with cyclohexane in a Soxhlet's extractor, dried and then washed with methanol in a Soxhlet's extractor to remove unreacted styrene macromer, by-produced polyvinylpyrrolidone and the like by extraction. The residue was thoroughly dried in a vacuum drier to obtain a graft polymer as white fine powder. The graft polymer obtained had a monomer unit ratio (A/B) of (A) polyvinylpyrrolidone segment to (B) polystyrene segment of 2.3 and a GPC molecular weight at peak of $2.1 \times 10^5$ daltons. Subsequently, a dope comprising 18 parts by weight of polysulfone (UDEL P-1700 (trademark), produced by Teijin Acomo Engineering Plastics KK) comprising a repeating unit represented by formula [VI] and 79 parts by weight of N,N-dimethylacetamide per 3 parts by weight of the graft copolymer obtained above was prepared. The dope obtained was cast on a glass plate by means of a surgical blade, dipped in a water bath adjusted at a temperature of 40° C. to effect phase separation and then washed three times with hot water at 70° C. for 1 hour by exchanging the hot water. As a result, Plane Membrane A was obtained. Plane Membrane A was subjected to the quantitative evaluation of platelets adhered and the result is shown in Table 1 as a relative value to the lactic acid dehydrogenase activity per the membrane unit area, which is an index for the quantity of platelets adhered to the polysulfone membrane, in Comparative Example 1 taken as 100. The amount of the graft copolymer remaining in the membrane and calculated from the graft copolymer content of the plane membrane determined by the NMR analysis and the amount of the graft copolymer added to the dope, is also shown in Table 1 together with the graft copolymer composition (A/B) in the membrane. Further, the membrane surface composition (the exposure ratio of polysulfone polymer and the covering ratio of vinylpyrrolidone unit) determined by the ESCA is shown in Table 6 and the decrement of the hydrophobic segment on the membrane surface determined by the ESCA and NMR analysis is shown in Table 7.

EXAMPLE 2

Plane Membrane B was manufactured in the same manner as in Example 1 except for using a dope composition comprising 1 part by weight of the graft copolymer, 18 parts by weight of polysulfone and 81 parts by weight of N,N-dimethylacetamide. Plane Membrane B was evaluated on the quantity of platelet adhered, the residual amount of graft copolymer, the graft copolymer composition in the membrane, the membrane surface composition and the decrement of the hydrophobic segment on the membrane surface in the same as in Example 1. The results obtained are shown in Tables 1, 6 and 7.

COMPARATIVE EXAMPLE 1

Plane Membrane C was manufactured in the same manner as in Example 1 except for not using the graft copolymer and using a dope composition comprising 18 parts by weight of polysulfone and 82 parts by weight of N,N-dimethylacetamide. Plane Membrane C was evaluated on the quantity of platelet adhered, and the lactic acid dehydrogenase activity per the unit membrane area obtained was taken as 100.

COMPARATIVE EXAMPLE 2

Plane Membrane D was manufactured in the same manner as in Example 2 except for using a dope composition comprising 1 part by weight of polyvinylpyrrolidone (K-90, produced by ISP Japan KK), 18 parts by weight of polysulfone and 81 parts by weight of N,N-dimethylacetamide. The quantity of platelet adhered was evaluated in the same manner as in Example 1 and the amount of polyvinylpyrrolidone remaining in the membrane was valuated by NMR in the same manner as in Example 1. The results are shown in Table 1.

COMPARATIVE EXAMPLE 3

Plane Membrane E was manufactured in the same manner as in Example 2 except for using a dope composition comprising 5 parts by weight of polyvinylpyrrolidone (K-90), 18 parts by weight of polysulfone and 77 parts by weight of N,N-dimethylacetamide. The quantity of platelets adhered was evaluated in the same manner as in Example 1 and the amount of polyvinylpyrrolidone remaining in the membrane was measured by NMR in the same manner as in Example 1. The results are shown in Table 1.

EXAMPLE 3

A graft copolymer was prepared in the same manner as in Example 1 except for using 13 parts by weight of styrene macromonomer, 87 parts by weight of N-vinylpyrrolidone and 0.15 parts by weight of azobisisobutyronitrile. The graft copolymer obtained had a monomer unit ratio (A/B) of (A) polyvinylpyrrolidone segment to (B) polystyrene segment of 2.5 and a GPC molecular weight at peak of $3.8 \times 10^5$ daltons. Subsequently, a hollow fiber was spun, using this graft copolymer, as follows. A dope comprising 18 parts by weight of polysulfone (UDEL P-1700) and 79 parts by weight of N,N-dimethylacetamide per 3 parts by weight of the graft copolymer obtained above was prepared. The dope was spun into a hollow fiber having an inner diameter of 200 $\mu$m and an outer diameter of 290 $\mu$m using a 40% N,N-dimethylacetamide aqueous solution as the inner coagulating solution and water as the outer coagulating solution. Hollow Fiber A sampled immediately after taking it out from the coagulation bath was washed eight times with hot water at 90° C. for 20 minutes. A hollow fiber was sampled after every washing and the amount of graft copolymer remaining in the hollow fiber was determined by NMR in the same manner as in Example 1. The result obtained is shown in Table 2.

From the coagulating solutions and the hot water used in the washing of hollow fiber, the solvent was recovered and the solvent recovery was determined. The result is shown in Table 3.

COMPARATIVE EXAMPLE 4

A hollow fiber was spun in the same manner as in Example 3 except for using a dope comprising 5 parts by weight of polyvinylpyrrolidone (K-90), 18 parts by weight of polysulfone and 77 parts by weight of N,N-dimethylacetamide. Hollow Fiber B sampled immediately after taking it out from the coagulation bath was determined on the amount of polyvinylpyrrolidone remaining in the hollow fiber at the washing process in the same manner as in Example 3. The result is shown in Table 2.

From the coagulating solutions and the hot water used in the washing of hollow fiber, the solvent was recovered and the solvent recovery was determined. The result is shown in Table 3.

EXAMPLE 4

A hollow fiber (Hollow Fiber A') after hot water washing (90° C., 20 minutes, 8 times) of Hollow Fiber A obtained in Example 3 was evaluated on the quantity of platelets adhered. A relative value to the lactic acid dehydrogenase activity per the unit area, which is an index for the quantity of platelets adhered to the polysulfone hollow fiber, in Comparative Example 5 taken as 100 is shown in Table 4.

COMPARATIVE EXAMPLE 5

A hollow fiber (Hollow Fiber C) was spun in the same manner as in Example 3 except for using a dope comprising 1 part by weight of polyvinylpyrrolidone (K-90), 18 parts by weight of polysulfone and 81 parts by weight of N,N-dimethylacetamide. Hollow Fiber C after hot water washing (90° C., 20 minutes, 8 times) was evaluated on the quantity of platelets adhered and the lactic acid dehydrogenase activity per the unit area on the inner surface of Hollow Fiber C was taken as 100.

EXAMPLE 5

A hollow fiber (Hollow Fiber D) was spun in the same manner as in Example 3 except for using a dope comprising 1 part by weight of the graft copolymer, 18 parts by weight of polysulfone and 81 parts by weight of N,N-dimethylacetamide. Hollow Fiber D after hot water washing (90° C., 20 minutes, 8 times) was evaluated on the quantity of platelet adhered. A relative value to the lactic acid dehydrogenase activity per the unit area, which is an index for the quantity of platelet adhered to the polysulfone hollow fiber, in Comparative Example 5 taken as 100 is shown in Table 4.

EXAMPLE 6

A graft copolymer was prepared in the same manner as in Example 1 except for using 20 parts by weight of styrene macromonomer, 80 parts by weight of N-vinylpyrrolidone and 0.10 parts by weight of azobisisobutyronitrile. The graft copolymer obtained had a monomer unit ratio (A/B) of (A) polyvinylpyrrolidone segment to (B) polystyrene segment of 1.8 and a GPC molecular weight at peak of $7.9 \times 10^5$ daltons. Subsequently, a dope comprising 18 parts by weight of polysulfone (UDEL P-1700) and 79 parts by weight of N,N-dimethylacetamide per 3 parts by weight of the graft copolymer obtained above was prepared. The dope obtained was cast on a glass plate by means of a surgical blade, dipped in a water bath adjusted at a temperature of 40° C. to effect phase separation and then washed three times with hot water at 70° C. for 1 hour by exchanging the hot water. As a result, Plane Membrane F was obtained. Plane Membrane F was subjected to the quantitative evaluation of platelets adhered. A relative value of the lactic acid dehydrogenase activity per the membrane unit area, which is an index for the quantity of platelet adhered to the polysulfone membrane, in Comparative Example 6 taken as 100, and the graft copolymer content (parts by weight) of the plane membrane per 100 parts by weight of polysulfone determined by the NMR analysis are shown in Table 5.

EXAMPLE 7

Plane Membrane G was manufactured in the same manner as in Example 6 except for using a dope comprising 1 part by weight of the graft copolymer, 18 parts by weight of polysulfone and 81 parts by weight of N,N-dimethylacetamide. The lactic acid dehydrogenase activity and the graft copolymer content determined in the same manner as in Example 6 are shown in Table 5.

EXAMPLE 8

Plane Membrane H was manufactured in the same manner as in Example 6 except for using a dope comprising 0.5 parts by weight of the graft copolymer, 18 parts by weight of polysulfone and 81.5 parts by weight of N,N-dimethylacetamide. The lactic acid dehydrogenase activity and the graft copolymer content determined in the same manner as in Example 6 are shown in Table 5.

EXAMPLE 9

Plane Membrane I was manufactured in the same manner as in Example 6 except for using a dope comprising 0.2 parts by weight of graft copolymer, 18 parts by weight of polysulfone and 81.8 parts by weight of N,N-dimethylacetamide. The lactic acid dehydrogenase activity and the graft copolymer content determined in the same manner as in Example 6 are shown in Table 5.

EXAMPLE 10

100 parts of dehydrated styrene and 500 parts of dehydrated tetrahydrofuran were charged in a flask and, thereto, 1.4 parts of 1.6 mol/l•n-butyl lithium was added while keeping the temperature at −20° C. with stirring in a nitrogen atmosphere. After continuing stirring for 8 hours, the reaction solution was transferred to a flask containing dry ice and stirred. Thereafter, the solution was poured into a large amount of a methanol solution of hydrochloric acid and then a white precipitate was obtained. The precipitate was separated by filtration, washed with water and dried under heating in a vacuum to obtain a styrene polymer having a carboxyl terminal group as white solid matter. 40 parts by weight of the white solid matter obtained, 60 parts by weight of polyvinylpyrrolidone (K-60, ISP Japan KK), 0.2 parts by weight of dimethylaminopyridine and 400 parts by weight of purified chloroform were placed in a flask and dissolution-mixed under stirring. Thereto, 0.25 parts by weight of dicyclohexyl-carbodiimide was added and the mixed solution was stirred for 6 hours. From the resulting solution, the solvent was removed under heating in a vacuum and then a white solid matter was obtained. This solid matter was grained into fine powder. The fine powder obtained was washed with toluene in a Soxhlet's extractor, dried and then washed with methanol in a Soxhlet's extractor. Thereafter, the fine powder was thoroughly dried in a vacuum drier to obtain a block copolymer as white fine powder. The block copolymer obtained had a monomer unit ratio (A/B) of (A) polyvinylpyrrolidone segment to (B) polystyrene segment of 2.2 and a GPC peak top molecular weight of 270,000 daltons. Subsequently, Plane Membrane J was manufactured in the same manner as in Example 6 except for using a dope comprising 18 parts by weight of polysulfone (UDEL P-1700) and 81 parts by weight of N,N-dimethylacetamide per 1 part by weight of the block copolymer obtained above. The lactic acid dehydrogenase activity and the block copolymer content determined in the same manner as in Example 6 are shown in Table 5.

COMPARATIVE EXAMPLE 6

Plane Membrane C obtained in Comparative Example 1 was evaluated on the quantity of platelet adhered simultaneously with the plane membranes obtained in Example 6 to 9. The lactic acid dehydrogenase activity per the unit membrane area determined for Plane Membrane C was taken as 100.

EXAMPLE 11

A graft copolymer was prepared in the same manner as in Example 1 except for using 40 parts by weight of styrene polymer, 60 parts by weight of N-vinylpyrrolidone and 0.25 parts by weight of azobisisobutyronitrile. The graft copolymer obtained had a monomer unit ratio (A/B) of (A) polyvinylpyrrolidone segment to (B) polystyrene segment of 0.9 and a GPC molecular weight at peak of $2.5 \times 10^5$ daltons. Subsequently, a dope comprising 18 parts by weight of polysulfone (UDEL P-1700) and 81.5 parts by weight of N,N-dimethylacetamide per 0.5 parts by weight of the graft copolymer obtained above was prepared. The dope obtained was cast on a glass plate by means of a surgical blade, dipped in a water bath adjusted at a temperature of 40° C. to effect phase separation and then washed three times with hot water at 70° C. for 1 hour by exchanging the hot water. As a result, Plane Membrane K was obtained. Plane Membrane K was evaluated on the membrane surface composition and the decrement of the hydrophobic segment on the membrane surface in the same manner as in Example 1. The results are shown in Tables 6 and 7.

COMPARATIVE EXAMPLE 7

An N-vinylpyrrolidone-styrene random copolymer emulsion (ANTARA430, produced by ISP) was concentrated and dried to solidify. As a result, N-vinylpyrrolidone-styrene random copolymer was obtained. Then, Plane Membrane L was manufactured in the same manner as in Example 2 except for using a dope comprising 18 parts by weight of polysulfone (UDEL P-1700) and 81 parts by weight of N,N-dimethylacetamide per 1 part by weight of the random copolymer obtained above. Plane Membrane L was evaluated on the membrane surface composition and the decrement of the hydrophobic segment on the membrane surface in the same manner as in Example 1. The results are shown in Tables 6 and 7.

TABLE 1

| Membrane | | Quantity of Platelets Adhered | Ratio of Copolymer Remaining in Membrane (%) | A/B |
|---|---|---|---|---|
| Example 1 | Plane Membrane A | 23 ± 6 | 96 | 2.3 |
| Example 2 | Plane Membrane B | 36 ± 16 | 97 | 2.4 |
| Comparative Example 1 | Plane Membrane C | 100 ± 29 | — | — |
| Comparative Example 2 | Plane Membrane D | 51 ± 19 | 48 | — |
| Comparative Example 3 | Plane Membrane E | 27 ± 12 | 45 | — |

The standard deviation SD of the quantity of platelet adhered is a value obtained from 5 measurement points.

TABLE 2

Ratio of Copolymer Remaining in Membrane (%)

| Number of Times of Washing | Example 3 (Hollow Fiber A) | Comparative Example 4 (Hollow Fiber B) |
|---|---|---|
| 0 | 96 | 62 |
| 1 | 97 | 51 |
| 2 | 97 | 47 |
| 3 | 96 | 45 |
| 4 | 98 | 44 |
| 5 | 96 | 46 |
| 6 | 96 | 45 |
| 7 | 97 | 45 |
| 8 | 96 | 45 |

TABLE 3

| | Solvent Recovery |
|---|---|
| Example 3 | 96% |
| Comparative Example 4 | 78% |

TABLE 4

| Hollow Fiber | Quantity of Platelet Adhered |
|---|---|
| Example 4 (Hollow Fiber A') | 30 ± 6 |
| Example 5 (Hollow Fiber D) | 66 ± 19 |
| Comparative Example 5 (Hollow Fiber C) | 100 ± 15 |

The standard deviation SD of the quantity of platelet adhered is a value obtained from 5 measurement points.

TABLE 5

| | Membrane | Quantity of Platelets Adhered | Amount of Graft Copolymer or Amount of Block Copolymer |
|---|---|---|---|
| Example 6 | Plane Membrane F | 10 ± 3 | 16 parts by weight |
| Example 7 | Plane Membrane G | 27 ± 8 | 5.3 parts by weight |
| Example 8 | Plane Membrane H | 56 ± 16 | 2.7 parts by weight |
| Example 9 | Plane Membrane I | 50 ± 3 | 1.1 parts by weight |
| Example 10 | Plane Membrane J | 31 ± 7 | 5.4 parts by weight |
| Comparative Example 10 | Plane Membrane C | 100 ± 9 | 0 part by weight |

The standard deviation SD of the quantity of platelet adhered is a value obtained from 5 measurement points.

The amount of graft copolymer and the amount of block copolymer are the parts by weight of the graft copolymer and the parts by weight of the block copolymer, respectively, when the amount of polysulfone in the plane membrane is taken as 100 parts by weight.

TABLE 6

| | Covering Ratio (X) of Vinylpyrrolidone Unit (%) | Exposure Ratio (Y) of Polysulfone (%) |
|---|---|---|
| Example 1 | 43.2 | 56.3 |
| Example 2 | 34.5 | 64.3 |
| Example 11 | 18.2 | 73.7 |
| Comparative Example 7 | 15.5 | 49.0 |

TABLE 7

| | Decrement of Hydrophobic Segment on the Membrane Surface |
|---|---|
| Example 1 | 0.97 |
| Example 2 | 0.92 |
| Example 11 | 0.60 |
| Comparative Example 7 | 0.02 |

INDUSTRIAL APPLICABILITY

The polysulfone membrane for blood purification of the present invention has excellent compatibility with the blood in methods and is useful as a membrane for purifying blood such as hemodialysis and hemofiltration.

The polysulfone membrane for purifying blood of the present invention uses a hydrophobic graft copolymer and/or block copolymer containing an appropriate amount of a hydrophobic component within the molecule as an additive compatible with the blood and therefore, the additive has strong affinity for the polysulfone resin and is not easily eluted even when the membrane is contacted with washing water, water for priming or the like. Due to this, the membrane of the present invention can be produced by a process simplified in the water washing step and elevated in the solvent recovery efficiency. Further, the membrane can be produced by a process which dispenses with the work for preventing elution of the polymer, such as cross-linking treatment.

What is claimed is:

1. A polysulfone membrane for purifying blood comprising a polysulfone and a graft copolymer consisting of (A) a hydrophilic segment and (B) a hydrophobic segment, the monomer unit ratio (A/B) of (A) to (B) being from 0.5 to 5 and the total of (A) and (B) being from 0.5 to 30 parts by weight per 100 parts by weight of polysulfone, wherein (B) is not polysulfone, and wherein (A) the hydrophilic segment and (B) the hydrophobic segment form the graft copolymer.

2. The polysulfone membrane for purifying blood as claimed in claim 1, wherein (A) a hydrophilic segment and (B) a hydrophobic segment form the block copolymer.

3. A polysulfone membrane for purifying blood comprising a polysulfone and a graft copolymer and/or block copolymer consisting of (A) a hydrophilic segment and (B) a hydrophobic segment, the monomer unit ratio (A/B) of (A) to (B) being from 0.5 to 5 and the total of (A) and (B) being from 0.5 to 30 parts by weight per 100 parts by weight of polysulfone, wherein (B) is not polysulfone, and wherein (B) the hydrophobic segment is a polystyrene segment.

4. The polysulfone membrane for purifying blood as claimed in claim 3, wherein the hydrophilic segment is a polyvinylpyrrolidone segment.

5. A polysulfone membrane for purifying blood comprising a polysulfone and a graft copolymer and/or block copolymer consisting of (A) a hydrophilic segment and (B) a hydrophobic segment, the monomer unit ratio (A/B) of (A) to (B) being from 0.5 to 5 and wherein the total of the hydrophilic segment (A) and the hydrophobic segment (B) is from 6 to 20 parts by weight per 100 parts by weight of polysulfone, wherein (B) is not polysulfone.

6. The polysulfone membrane for purifying blood as claimed in claim 5, wherein the monomer unit ratio (A/B) of the hydrophilic segment (A) to the hydrophobic segment (B) is from 1 to 4.

7. The polysulfone membrane for purifying blood as claimed in claim 5, wherein the monomer unit ratio (A/B) of the hydrophilic segment (A) to the hydrophobic segment (B) is from 1.2 to 3.

8. A process for producing a polysulfone membrane for purifying blood, comprising dissolving polysulfone and a graft copolymer comprising (A) a hydrophilic segment and (B) a hydrophobic segment in a total amount of from 0.5 to 30 parts by weight per 100 parts by weight of polysulfone, with the monomer unit ratio (A/B) between the segments (A) and (B) being from 0.5 to 5, in a predetermined solvent to have a polysulfone concentration of from 12 to 25 wt % based on the dope prepared, forming the film formation dope into a plane membrane or a hollow fiber, contacting the plane membrane or hollow fiber formed with a predetermined coagulating solution, removing the solvent and washing the residue; wherein (B) is not polysulfone, and (A) the hydrophilic segment and (B) the hydrophobic segment form the graft copolymer.

9. The process for producing a polysulfone membrane for purifying blood as claimed in claim 8, wherein the hydrophilic segment is a polyvinylpyrrolidone segment and the hydrophobic segment is a polystyrene segment.

10. A polysulfone membrane for purifying blood comprising a polysulfone and a graft copolymer and/or block copolymer consisting of (A) a hydrophilic segment and (B) a hydrophobic segment, the monomer unit ratio (A/B) of (A) to (B) being from 0.5 to 5 and the total of (A) and (B) being from 0.5 to 30 parts by weight per 100 parts by weight of polysulfone, wherein (B) is not a polysulfone, and wherein the monomer unit ratio (U=B'/A') between the hydrophobic segment (B') and the hydrophilic segment (A') present on the surface of the membrane is smaller than the monomer unit ratio (V=B/A) between the hydrophobic segment (B) and the hydrophilic segment (A) present in the entire membrane.

11. The polysulfone membrane for purifying blood as claimed in claim 10, wherein the value (W) obtained by dividing a value resulting from subtracting the monomer unit ratio (U=B'/A') between the hydrophobic segment (B') and the hydrophilic segment (A') present on the membrane surface from the monomer unit ratio (V=B/A) between the hydrophobic segment (B) and the hydrophilic segment (A) present in the entire membrane, by the monomer unit ratio (V=B/A) between the hydrophobic segment (B) and the hydrophilic segment (A) present in the entire membrane is from 0.3 to 1.

12. A process for producing a polysulfone membrane for purifying blood comprising dissolving polysulfone and a graft copolymer and/or block copolymer comprising (A) a hydrophilic segment and (B) a hydrophobic segment in a total amount of from 0.5 to 30 parts by weight per 100 parts by weight of polysulfone, with the monomer unit ratio (A/B) between the segments (A) and (B) being from 0.5 to 5, in a predetermined solvent to have a polysulfone at a concentration of from 12 to 25 wt % based on the dope prepared, forming the film formation dope into a plane membrane or a hollow fiber, contacting the plane membrane or hollow fiber formed with a predetermined coagulating solution, removing the solvent and washing the residue; wherein (B) is not polysulfone, and (B) the hydrophobic segment is a polystyrene segment.

13. The process for producing a polysulfone membrane for purifying blood as claimed in claim 12, wherein (A) a hydrophilic segment and (B) a hydrophobic segment form the block copolymer.

14. The process for producing a polysulfone membrane for purifying blood as claimed in claim 12, the hydrophilic segment is a polyvinylpyrrolidone segment.

* * * * *